United States Patent Office
2,740,324
Patented Apr. 3, 1956

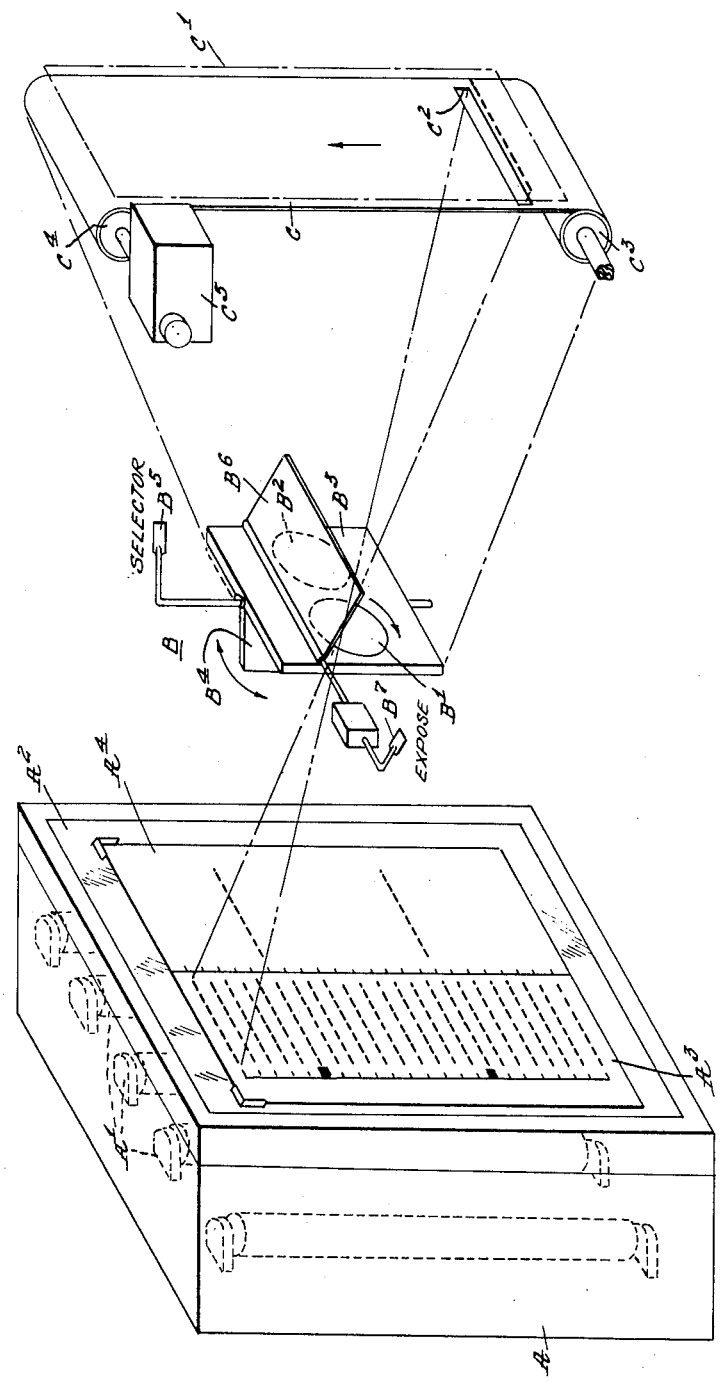

2,740,324

PHOTOCOMPOSITION CORRECTION AND MAKEUP DEVICE

John J. Cahill, Jr., Watertown, Mass., assignor to Mergenthaler Linotype Company, a corporation of New York Application October 10, 1952, Serial No. 314,111

4 Claims. (Cl. 88—24)

This invention relates to the art of photocomposition wherein type characters are photographed on film and the film is thereafter utilized to produce a printing surface, but more particularly, the invention is directed to a device for producing or making up a corrected film from a composed film containing errors.

Corrections have ordinarily been made at the make-up stage when the film is being arranged in page form. Portions of the film requiring correction are carefully cut out and corrected strips of film inserted in their place. This procedure for making corrections is time-consuming and tedious and is unquestionably one of the more serious obstacles to the commercial acceptance of photocomposition in the graphic arts.

The present invention provides means for re-photographing the previously composed matter on a new film and inserting entire corrected lines at points where errors appear and, further, is suitable for performing some of the work of page make-up by making possible the insertion of matter not on the original galley film, e. g., titles, folios, footnotes, etc. The invention will be described in greater detail below.

The single figure is a perspective illustrative view of the present invention.

The following elements are arranged in the manner shown within a light-tight enclosure (not shown): a light-box, generally designated by the reference character A; an optical system, generally designated B; and a masking screen, designated C.

The light-box houses a series of fluorescent light tubes $A^1$ and is provided on one side with a translucent glass plate $A^2$ against which the composed film $A^3$ requiring correction is mounted. The lines requiring correction may, if desired, be suitably marked for easy identification. The lines requiring correction are then properly re-composed on a film $A^4$, which film is mounted on the glass plate $A^2$ adjacent to the film $A^3$ with the corrected lines carefully placed at the same horizontal level as the lines which require correction. Preferably, the margins of both films will bear index marks placed photographically or by other means to assist in relatively positioning the films.

The optical system consists essentially of a pair of convex projecting lenses $B^1$ and $B^2$, placed side by side in a mounting $B^3$. By proper attention to the positioning of the lenses, images of composed matter on either film $A^3$ or $A^4$, can be projected in the same image plane. Thus, the lens $B^1$ is adapted to project an image of the film $A^3$ on a new film $C^1$ positioned behind the mask C, as indicated by the broken lines in Fig. 1; likewise, the lens $B^2$ is adapted to project an image of the film $A^4$ on the film $C^1$. By providing a selector shutter $B^4$, pivotally attached to the mounting $B^3$ between the lenses, and operable by a selector switch or lever $B^5$ to cover either lens, it is possible to open up only one lens at a time and to copy the typographical matter situated at the same horizontal level from either film $A^3$ or $A^4$. An exposure shutter $B^6$, pivotally attached to the front of the mounting $B^3$ and covering both lenses, is operable by a lever $B^7$.

To permit the lines on the films $A^3$ and $A^4$ to be photographed one at a time onto the film $C^1$, the mask is provided with a horizontal slot $C^2$ which may be moved, and as the images are photographed on the film $C^1$ upside-down, the slot is movable in stepwise fashion from a lower spindle $C^3$ onto an upper spindle $C^4$. The spindle $C^4$ may be rotated by any suitable drive means $C^5$, and when the slot $C^2$ has traveled the entire length of the film $C^1$, the slot may be returned to start position by rewinding the spindle $C^3$.

In operation, the selector shutter $B^4$ is normally set to cover the lens $B^2$, and the exposure lever $B^7$ operated to photograph the type matter of the film $A^3$ line-by-line as the slot $C^3$ moves upwardly step by step. When a line to be corrected is reached, the selector shutter is shifted, covering the lense $B^1$ and uncovering the lens $B^2$, and the exposure shutter $B^6$ operated to photograph the corresponding corrected line on the film $A^4$. The selector shutter is then returned to normal position, covering the lens $B^2$, and the photographing of the lines of the film $A^3$ resumed until the next line in need of correction is reached.

The application of the present invention for inserting typographical matter not appearing on the original galley film, such as titles, folios, footnotes, etc., is believed apparent.

Although the various controls for the present invention are shown and described as completely manual for the sake of simplicity, it is evident that the required functions may be mechanized and synchronized through an automatic control. For example, the mechanism which drives the mask may be controlled by a photo-cell head which moves down the edge of the column of the film $A^3$ where the code signifying the presence of an error is placed, and if the photo-cell detects an error, it will reverse the selector shutter $B^4$ to permit the exposure of the corrected line and then again return the selected shutter to normal position.

The invention has been shown and described in a simple form and by way of example, and obviously many variations and modifications may be made therein which will still be comprised within its spirit. It is to be understood, therefore, that the invention is not to be limited to any specific form or embodiment, except insofar as such limitations are specified in the appended claims.

What is claimed is:

1. A device for re-photographing typographical matter on film comprising, in combination, means for mounting composed film side by side in a stationary position, a source of light behind the film, means for mounting a light sensitive film in a stationary position and in fixed relation to the composed film, an optical system for projecting an image of the typographical matter from all of the composed films onto the same area of the light sensitive film, a mask having a slot therein to permit the image of but a strip of the typographical matter to fall upon the light sensitive film, said mask being movable in relation to the light sensitive film in step by step fashion to permit one strip after another to be photographed through the slot, an exposure shutter, and a selector shutter to permit the projection of the typographical matter from any of the mounted composed films onto the light sensitive film.

2. A film correcting device comprising, in combination, a stationary translucent mounting for film, a light source behind said mounting, a composed film containing errors being affixed to said mounting, and a second composed film containing the desired corrections being mounted adjacent thereto, a stationary mounting for a light sensitive film arranged in fixed relation to the composed films, a pair of lenses, one of said lenses being adapted to project an image of the film containing the errors onto the light sensitive film and the other being adapted to project an image of the film containing the corrections onto the same area of the light sensitive film, an exposure shutter, a mask having a slot therein to permit but a portion of the typographical matter from either film to be projected onto the light sensitive film, said mask being movable in relation to the light sensitive film after each exposure through the slot, and a shutter to select which lens will be in use at any given time.

3. A combination according to claim 2, wherein the corrected matter is indexed relative to and at the same horizontal level as the matter to be deleted on the film containing the errors.

4. A combination according to claim 2, wherein the slot permits the projection onto the light sensitive film of but a single line of type at a time.

References Cited in the file of this patent

UNITED STATES PATENTS

| | | |
|---|---|---|
| 1,591,118 | Friess | July 6, 1926 |
| 2,027,026 | Dirkes | Jan. 7, 1936 |
| 2,616,330 | Westover | Nov. 4, 1952 |